US012768393B2

(12) United States Patent
Yoshie

(10) Patent No.: US 12,768,393 B2
(45) Date of Patent: Oct. 20, 2026

(54) CONNECTOR AND CONNECTOR PRODUCTION METHOD

(71) Applicant: YKK CORPORATION, Tokyo (JP)

(72) Inventor: Kenichi Yoshie, Kurobe (JP)

(73) Assignee: YKK CORPORATION, Tokyo (JP)

( * ) Notice: Subject to any disclaimer, the term of this patent is extended or adjusted under 35 U.S.C. 154(b) by 0 days.

(21) Appl. No.: 19/132,059

(22) PCT Filed: Nov. 24, 2022

(86) PCT No.: PCT/JP2022/043427

§ 371 (c)(1),
(2) Date: May 22, 2025

(87) PCT Pub. No.: WO2024/111099

PCT Pub. Date: May 30, 2024

(65) Prior Publication Data

US 2026/0194103 A1 Jul. 9, 2026

(51) Int. Cl.
*F16B 45/02* (2006.01)

(52) U.S. Cl.
CPC .................................. *F16B 45/036* (2021.05)

(58) Field of Classification Search
CPC ..................................................... F16B 45/036
See application file for complete search history.

(56) References Cited

U.S. PATENT DOCUMENTS 1,764,813 A * 6/1930 Thornley .............. F16B 45/036 24/600.9
2,269,662 A * 1/1942 Guyot .................... A44B 99/00 24/519

(Continued)

FOREIGN PATENT DOCUMENTS

EP 1555007 A1 * 7/2005 ......... B65D 81/3266
FR 2492916 A1 * 4/1982 ............ F16B 45/034

(Continued)

OTHER PUBLICATIONS

YKK Corporation; International Search Report and Written Opinion for PCT Application No. PCT/JP2022/043427, filed Nov. 24, 2022, mailed Dec. 27, 2022, 13 pgs.

(Continued)

*Primary Examiner* — Jason W San
(74) *Attorney, Agent, or Firm* — Meunier Carlin & Curfman LLC

(57) ABSTRACT

A connector includes: a base having a hole penetrating in a thickness direction; a hook including a shaft connected to the base and a folded portion folded from the shaft, the hook and the base defining a hook space penetrating therebetween in the thickness direction; and a spring connected to the shaft, the spring includes: an arc-shaped curved portion that overlaps the base in the thickness direction and is arranged along an edge of the hole; an extension portion extending to connect one end of the curved portion to the shaft, and a cover connected to the other end of the curved portion, and the cover is movable between a closed position, in which an opening of the hook space is closed, and an open position, in which the opening is open, the opening being defined between the distal end of the folded portion and the base.

8 Claims, 9 Drawing Sheets

(56) References Cited

U.S. PATENT DOCUMENTS

| | | | | | |
|---|---|---|---|---|---|
| 2,969,668 | A * | 1/1961 | Aitchison | F16B 45/015 59/91 |
| 3,854,482 | A * | 12/1974 | Laugherty | A61B 17/122 292/322 |
| 3,913,187 | A * | 10/1975 | Okuda | F16L 3/1075 24/484 |
| 4,220,301 | A * | 9/1980 | Jacobs | A42B 3/20 2/9 |
| 4,511,164 | A * | 4/1985 | Orchard | F16L 33/12 24/270 |
| 5,005,266 | A * | 4/1991 | Fister | F16B 45/02 24/601.5 |
| 5,671,514 | A * | 9/1997 | Matoba | F16B 45/036 24/601.2 |
| 5,913,479 | A * | 6/1999 | Westwood, III | B66C 1/36 24/600.9 |
| 6,035,497 | A * | 3/2000 | Jackson | A44B 19/262 24/429 |
| 6,230,375 | B1 * | 5/2001 | Catlett | F16B 45/023 24/599.8 |
| 6,742,223 | B1 * | 6/2004 | Chang | H02G 3/32 24/30.5 R |
| 6,772,488 | B1 * | 8/2004 | Jensen | F16B 45/036 24/599.6 |
| 7,047,604 | B2 * | 5/2006 | Axel | A01K 27/00 294/158 |
| 7,475,456 | B2 * | 1/2009 | Thompson | F16B 45/023 24/600.1 |
| D633,371 | S * | 3/2011 | Stevens | D8/367 |
| 7,946,005 | B2 | 5/2011 | Lee | |
| 8,474,112 | B2 * | 7/2013 | Thompson | F16B 45/023 24/600.2 |
| D695,100 | S * | 12/2013 | Whitaker | D8/396 |
| 9,677,597 | B2 * | 6/2017 | Yoo | F16B 45/036 |
| 9,856,036 | B2 * | 1/2018 | Dickson | B64F 1/029 |
| 9,964,138 | B2 * | 5/2018 | Codega | F16B 45/036 |
| 10,125,906 | B2 * | 11/2018 | Whitaker | A61M 39/284 |
| 11,187,374 | B2 * | 11/2021 | Tucker | A47G 25/0678 |
| 11,686,339 | B2 * | 6/2023 | Walker | F16B 45/023 24/599.1 |
| 11,717,062 | B2 * | 8/2023 | Cowdery | A44B 13/02 24/381 |
| 12,618,431 | B2 * | 5/2026 | Atteberry | F16B 45/022 |
| 2008/0083862 | A1 * | 4/2008 | Salatka | A47G 29/083 248/308 |
| 2009/0183347 | A1 * | 7/2009 | Abels | F16B 45/024 24/599.6 |
| 2010/0186202 | A1 * | 7/2010 | Schwappach | F16B 45/02 29/428 |
| 2010/0268161 | A1 * | 10/2010 | Traversaz | A61M 5/14244 604/151 |
| 2015/0231423 | A1 * | 8/2015 | Perner | A62B 35/0075 24/518 |
| 2016/0298675 | A1 * | 10/2016 | Yoo | F16M 13/02 |
| 2023/0134450 | A1 * | 5/2023 | Barnhart | H04R 1/028 24/303 |

FOREIGN PATENT DOCUMENTS

| | | | | |
|---|---|---|---|---|
| GB | 2626997 | A * | 8/2024 | F16B 7/04 |
| JP | H08308614 | A | 11/1996 | |
| JP | 2009002389 | A | 1/2009 | |
| JP | 2020045930 | A | 3/2020 | |
| WO | WO-2024170989 | A1 * | 8/2024 | F16B 7/04 |

OTHER PUBLICATIONS

YKK Corporation; International Preliminary Report on Patentability for PCT Application No. PCT/JP2022/043427, filed Nov. 24, 2022, mailed May 27, 2025, 4 pgs.

* cited by examiner

CONNECTOR AND CONNECTOR PRODUCTION METHOD

TECHNICAL FIELD

The present invention relates to a connector that connects a plurality of objects, and a production method of the connector.

BACKGROUND ART

There is typically a connector that connects a plurality of objects, the connector including a base to which one of the objects is attached, a hook to which the other of the objects is attached, and a spring that elastically opens or closes an opening of the hook (see, for instance, Patent Literature 1).

The connector described in Patent Literature 1 includes a casing member including the base, and a ring member including the hook and the spring. A thin portion is formed in the spring of the ring member. Elastic deformation of the thin portion causes the opening of the hook to be opened or closed. The casing member houses the thin portion of the ring member, thereby ensuring strength of the connector.

CITATION LIST

Patent Literature(s)

Patent Literature 1: JP 2009-2389 A

SUMMARY OF THE INVENTION

Problem(s) to Be Solved by the Invention

In general, a typical connector is configured by a combination of a plurality of resin members as described in Patent Literature 1 or configured using a metal material, in order to ensure the strength of the connector while allowing the opening of the hook to be elastically opened or closed.

However, a case where the connector is configured by a combination of the resin members involves a high assembly cost. A case where the connector is configured using a metal material involves a high material cost.

An object of the invention is to provide a connector capable of ensuring strength and capable of being integrally molded using a resin material, and a production method of the connector.

Means for Solving the Problem(s)

According to an aspect of the invention, a connector includes: a base having a hole penetrating in a thickness direction; a hook including a shaft connected to the base and a folded portion folded from the shaft, the hook and the base defining a hook space penetrating therebetween in the thickness direction; and a spring connected to the shaft, in which the base, the hook, and the spring are integrally molded using a resin material, the spring includes: an arc-shaped curved portion that overlaps the base in the thickness direction and is arranged along an edge of the hole; an extension portion extending to connect one end of the curved portion to the shaft; and a cover connected to the other end of the curved portion, and the cover is movable between a closed position, in which an opening of the hook space is closed, and an open position, in which the opening is open, the opening being defined between the distal end of the folded portion and the base.

In the above configuration, the base, the hook, and the spring for forming the connector can be integrally molded from a resin material. The spring can reliably have a long spring length extending from the extension portion through the curved portion to the cover. With this configuration, even without forming a typical thin portion, the spring can be elastically deformed to move the cover between the closed position and the open position. The curved portion of the spring is arranged to overlap the base in the thickness direction, and is therefore protected from the outside by the base. Therefore, according to the exemplary arrangement of the invention, a connector capable of ensuring strength and capable of being integrally molded using a resin material is provided.

In the above aspect of the invention, it is preferable that the base includes: a body facing the curved portion in the thickness direction; and a protrusion protruding from the body in the thickness direction toward the curved portion, when the cover is in the closed position, a gap exists between an inner circumferential surface of the curved portion and the protrusion, and when the cover is in the open position, the inner circumferential surface of the curved portion is in contact with the protrusion.

In the above configuration, the protrusion can support the curved portion without unnecessarily obstructing the movement of the spring, thereby improving the strength of the connector.

In the above aspect of the invention, it is preferable that the protrusion has an arc-shaped outer circumferential surface capable of contacting the inner circumferential surface of the curved portion.

In the above configuration, the protrusion can support a wider area of the curved portion, thereby further improving the strength of the connector.

In the above aspect of the invention, it is preferable that the base has a ring shape with a cutout interconnecting the hole with the hook space.

In the above configuration, an object to be attached can reach the hole of the base through the hook space and the cutout. This makes it easy to attach the object to the base.

In the above aspect of the invention, it is preferable that the base includes: a base end connected to the shaft; and a distal end provided opposite the base end across the cutout and facing the hook space.

In the above configuration, by bringing the object to be attached into contact with the distal end of the base when moving the object from the hook space to the cutout, the object can be easily positioned with respect to the cutout.

In the above aspect of the invention, it is preferable that the extension portion is connected to an outer side surface of the shaft opposite from the hook space.

In the above configuration, the spring is arranged along an edge of the hole of the base, outside the shaft. Accordingly, a length of the spring can be reliably made long while avoiding interference between the spring and the shaft. This facilitates an opening/closing movement of the cover.

In the above aspect of the invention, it is preferable that the cover has an engagement portion engageable with the distal end of the folded portion, and a dimension in the thickness direction of the engagement portion is larger than a dimension in the thickness direction of the curved portion.

In the above configuration, engagement strength between the engagement portion and the distal end of the folded portion can be improved.

According to another aspect of the invention, a production method of the connector according to the above aspect includes: integrally molding a molded product using a resin material, the molded product including the base, the hook, and the spring with the curved portion positioned offset from an outer circumference of the base when viewed from the thickness direction; and after the molding, assembling the connector, including elastically deforming the spring so that the curved portion overlaps the base in the thickness direction and engaging the cover with the distal end of the folded portion.

According to such a production method, the above-described connector is suitably producible.

DESCRIPTION OF EMBODIMENT(S)

Figure 1:
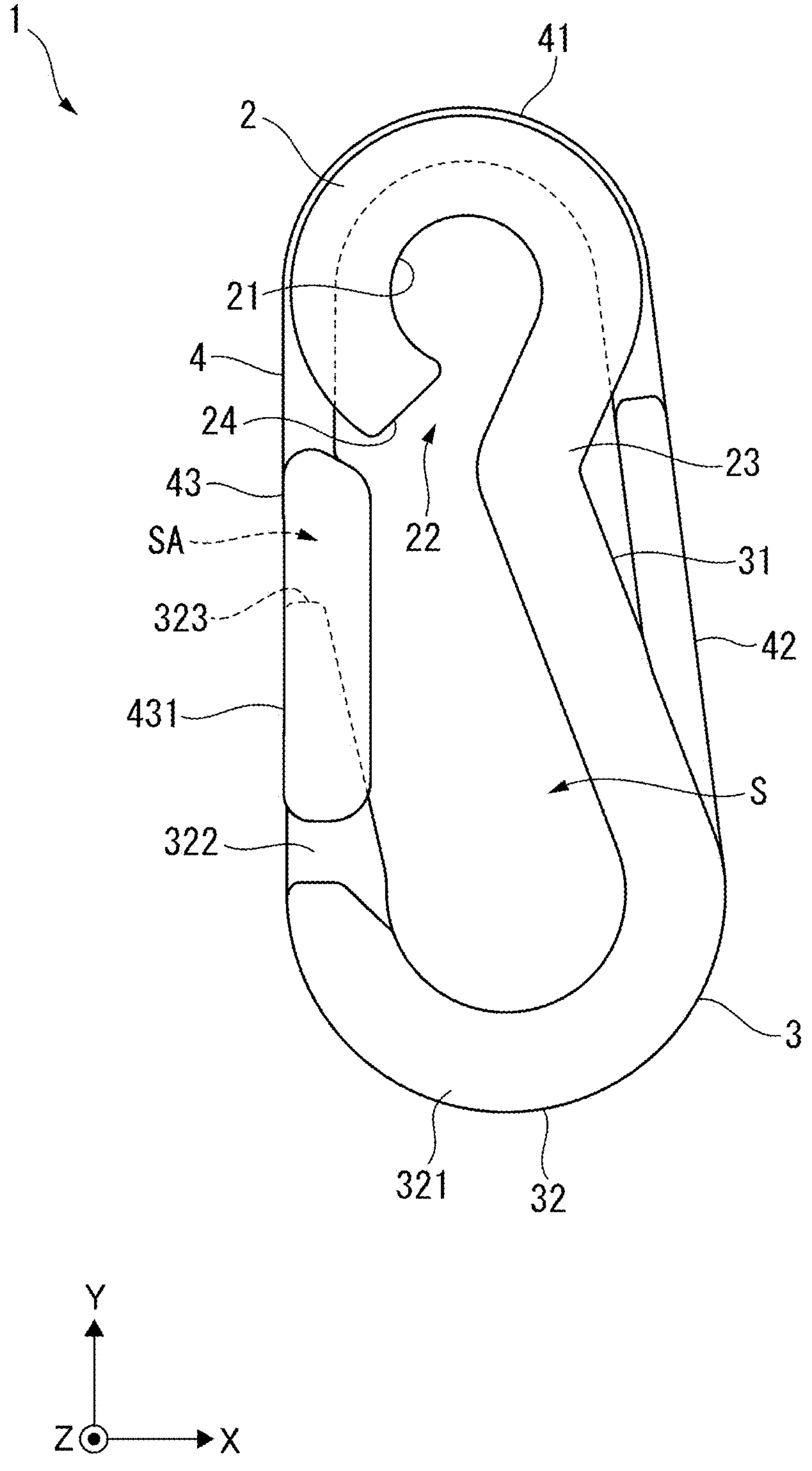
FIG. 1 is a front view of a connector according to an exemplary embodiment of the invention.

An exemplary embodiment of the invention will be described below with reference to drawings attached.

FIGS. 1 to 9 illustrate a connector 1 according to the exemplary embodiment. This connector 1, which connects a plurality of objects, includes a base 2 to which one (e.g., a first ring 91 in FIG. 9) of the objects is attachable, a hook 3 to which the other (e.g., a second ring 92 in FIG. 9) of the objects is attachable, and a spring 4 that opens or closes an opening SA in a hook space S.

In the description below, a thickness direction (front-back direction) of the connector 1 is defined as a Z direction. A front side of the connector 1 is defined as a +Z side and a rear side of the connector 1 is defined as a −Z side. A direction that is orthogonal to the Z direction and is a length direction of the connector 1 is defined as a Y direction. A direction that is orthogonal to the Y direction and the Z direction and is a width direction (right-left direction) of the connector 1 is defined as an X direction. One side of the width direction of the connector 1 is defined as a +X side and the other side of the width direction of the connector 1 is defined as a −X side. A plane orthogonal to the Z direction is defined as an XY plane.

Configuration of Connector 1

A configuration of the connector 1 will be described with reference to FIGS. 1 to 5. The base 2, the hook 3, and the spring 4 that form the connector 1 are integrally molded using a resin material such as synthetic resin. The following description is based on a state where the spring 4 closes the opening SA of the hook space S.

The base 2 has a ring shape with a hole 21 and a cutout 22 both penetrating in the Z direction, as illustrated in FIG. 1. The hole 21 has substantially a circle shape. The cutout 22 has a tapered shape with a width decreasing toward the hole 21 and interconnects an inner space with an outer space with respect to the hole 21. This ring-shaped base 2 includes: a base end 23 to which the hook 3 is connected; and a distal end 24 opposite the base end 23 across the cutout 22.

Figure 2:
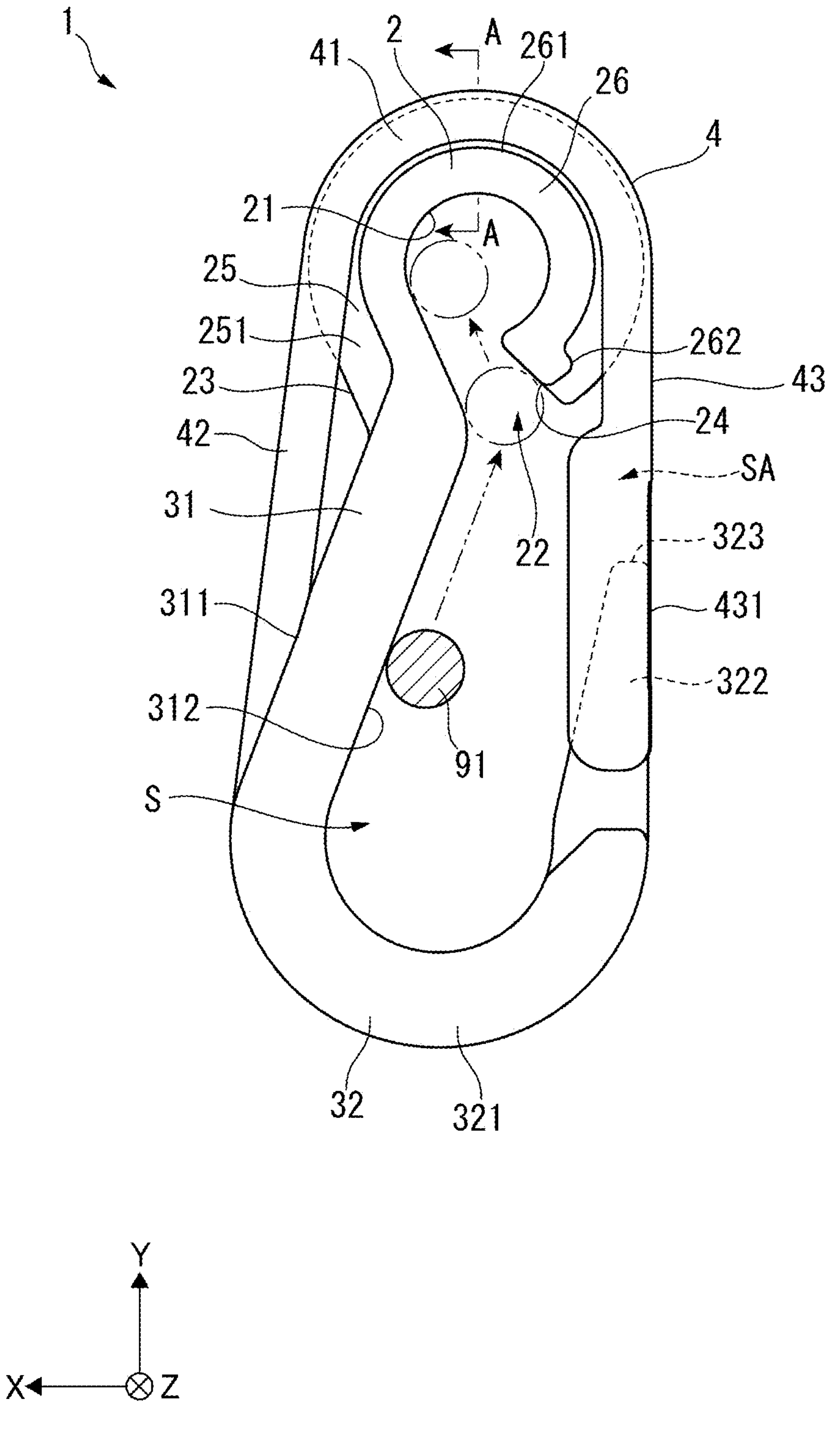
FIG. 2 is a rear view of the connector according to the exemplary embodiment.
Figure 3:
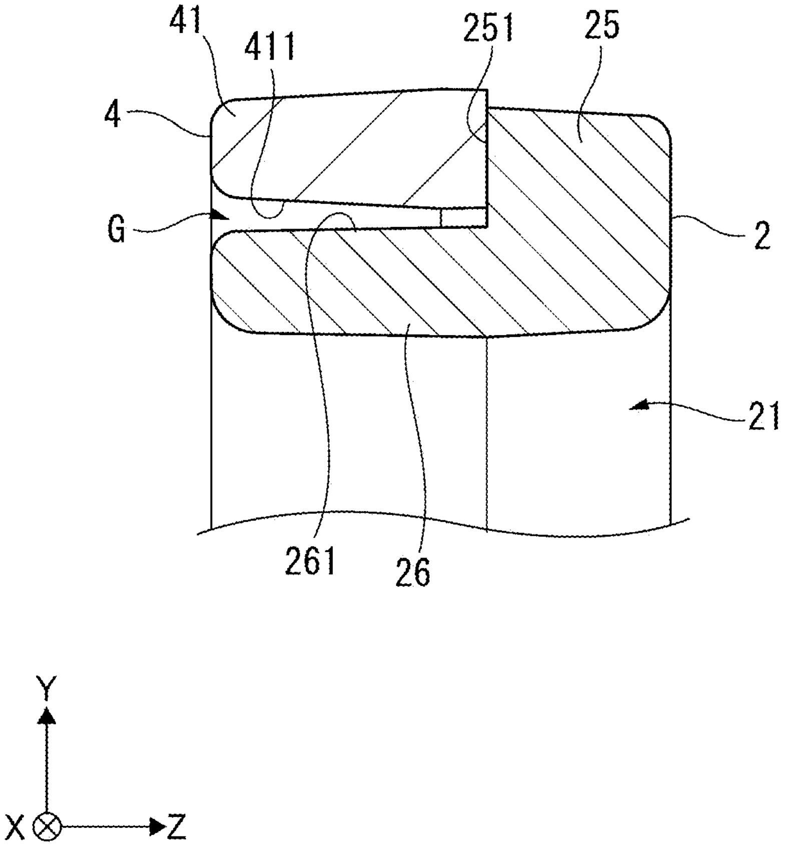
FIG. 3 is a cross-sectional view taken along an A-A line in FIG. 2.

As illustrated in FIGS. 2 and 3, the base 2 also includes: a body 25 facing the spring 4 in the Z direction; and a protrusion 26 protruding from the body 25 in the Z direction toward the spring 4 (toward the −Z side).

The body 25 has a ring shape with the hole 21 and cutout 22 formed as described above. The body 25 has a side surface 251 facing the spring 4 in the Z direction.

The protrusion 26, similar to the body 25, has a ring shape with the hole 21 and cutout 22 formed as described above, and protrudes from an edge of the hole 21 of the body 25 toward the −Z side. The protrusion 26 has an outer circumferential surface 261 in an arc in the XY plane. The protrusion 26 also has a convex portion 262 protruding outward in a radial direction from the outer circumferential surface 261, at the distal end 24 of the base 2.

As illustrated in FIGS. 1 and 2, the hook 3 includes: a shaft 31 connected to the base 2; and a folded portion 32 folded from the shaft 31. The hook 3 and the base 2 define the hook space S penetrating therebetween in the Z direction. The hook space S is a space in the hook 3, into which an object is insertable in the Z direction.

The shaft 31 is connected to the base end 23 of the base 2 (specifically, the body 25 and the protrusion 26 of the base end 23 of the base 2) and extends in a direction away from the base 2. In the exemplary embodiment, the shaft 31 is arranged in a direction that is orthogonal to the Z direction and is slightly inclined with respect to the Y direction.

The folded portion 32 includes: a bottom piece 321 connected to an end of the shaft 31 opposite from the base 2 and extending in a curve toward one side (−X side) of the X direction; and a latch piece 322 extending in a direction approaching the base 2 from the bottom piece 321. In the exemplary embodiment, the latch piece 322 is arranged along the Y direction. A distal end of the latch piece 322 is a distal end 323 of the folded portion 32. The distal end 323 and the base 2 define the opening SA of the hook space S therebetween.

Figure 4:
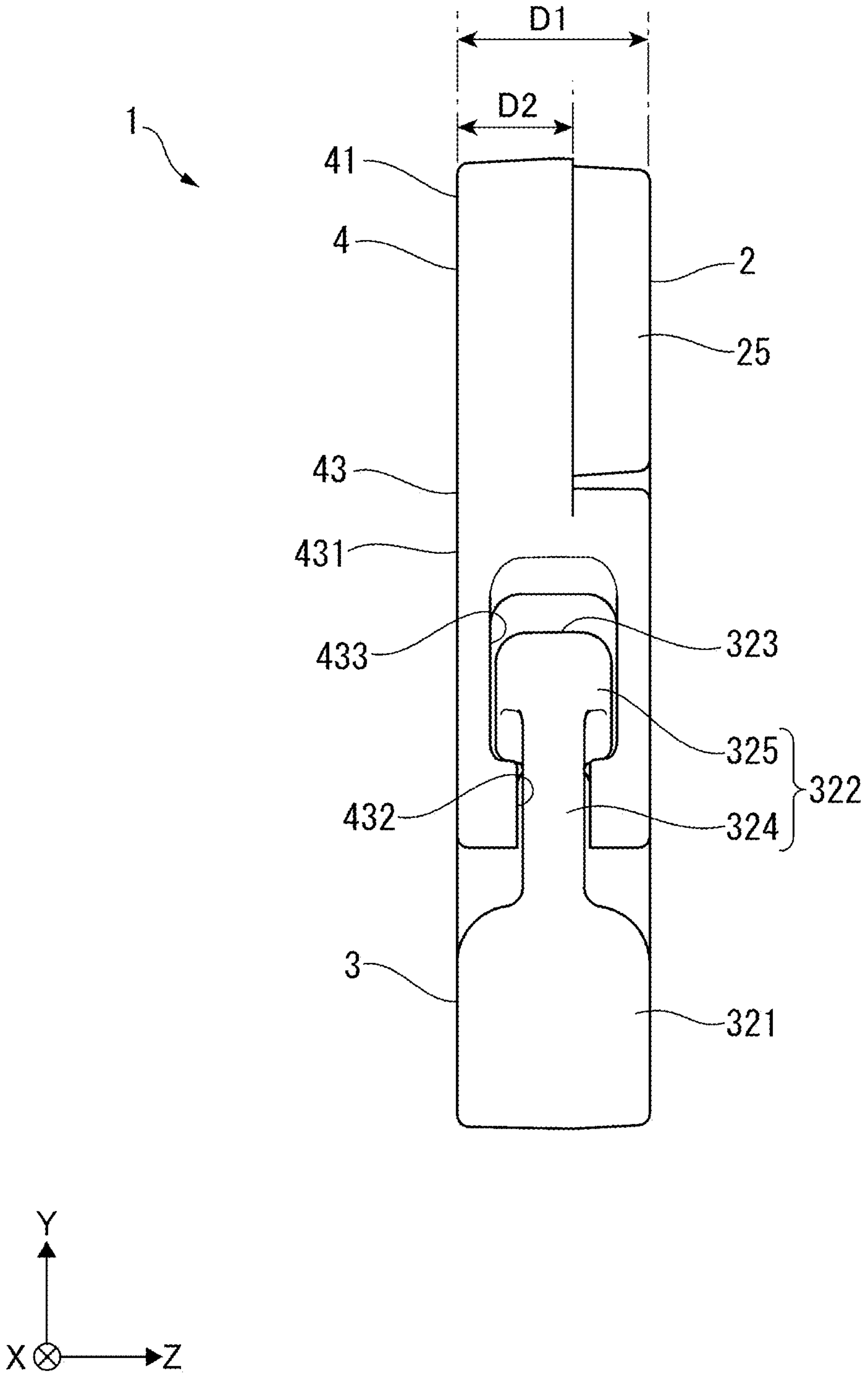
FIG. 4 is a side view of the connector according to the exemplary embodiment.

The latch piece 322 is configured such that a later-described cover 43 of the spring 4 is engageable with the latch piece 322. Specifically, as illustrated in FIG. 4, the latch piece 322 has the bar 324 connected to the bottom piece 321, and a bulging portion 325 connected to a bar 324. A Z directional dimension of each of the bar 324 and the bulging portion 325 is smaller than a Z directional dimension of the bottom piece 321. The Z directional dimension of the bulging portion 325 is larger than the Z directional dimension of the bar 324. As illustrated in FIG. 1, a +X side surface of the latch piece 322 is inclined with respect to the Y direction, and an X-directional length of the latch piece 322 gradually decreases toward the distal end 323.

The spring 4 is a U-shaped plate spring as a whole as illustrated in FIG. 2. Specifically, the spring 4 has an arc-shaped curved portion 41 overlapping the base 2 in the Z direction and arranged along the edge of the hole 21, an extension portion 42 extending to connect one end of the curved portion 41 to the shaft 31, and the cover 43 connected to the other end of the curved portion 41.

The curved portion 41 overlaps the body 25 of the base 2 in the Z direction. Specifically, as illustrated in FIG. 3, the curved portion 41 is in contact with the side surface 251 of the body 25 in the Z direction and is slidable along the side surface 251. Moreover, as illustrated in FIG. 2, the curved portion 41 is curved to surround the outer circumferential surface 261 of the protrusion 26 for half a circumference. The curved portion 41 has an inner circumferential surface 411 in an arc in the XY plane.

In the exemplary embodiment, the curved portion 41 may be arranged with a part projecting beyond the body 25 when viewed in the Z direction. The curved portion 41 may be arranged without contact with the side surface 251 of the body 25, that is, there may be a gap between the curved portion 41 and the side surface 251.

The extension portion 42 is connected to an outer side surface 311 of the shaft 31 opposite from the hook space S. The extension portion 42 projects from the outer side surface 311 of the shaft 31. An acute-angled gap is formed between the extension portion 42 and the shaft 31.

Figure 5:
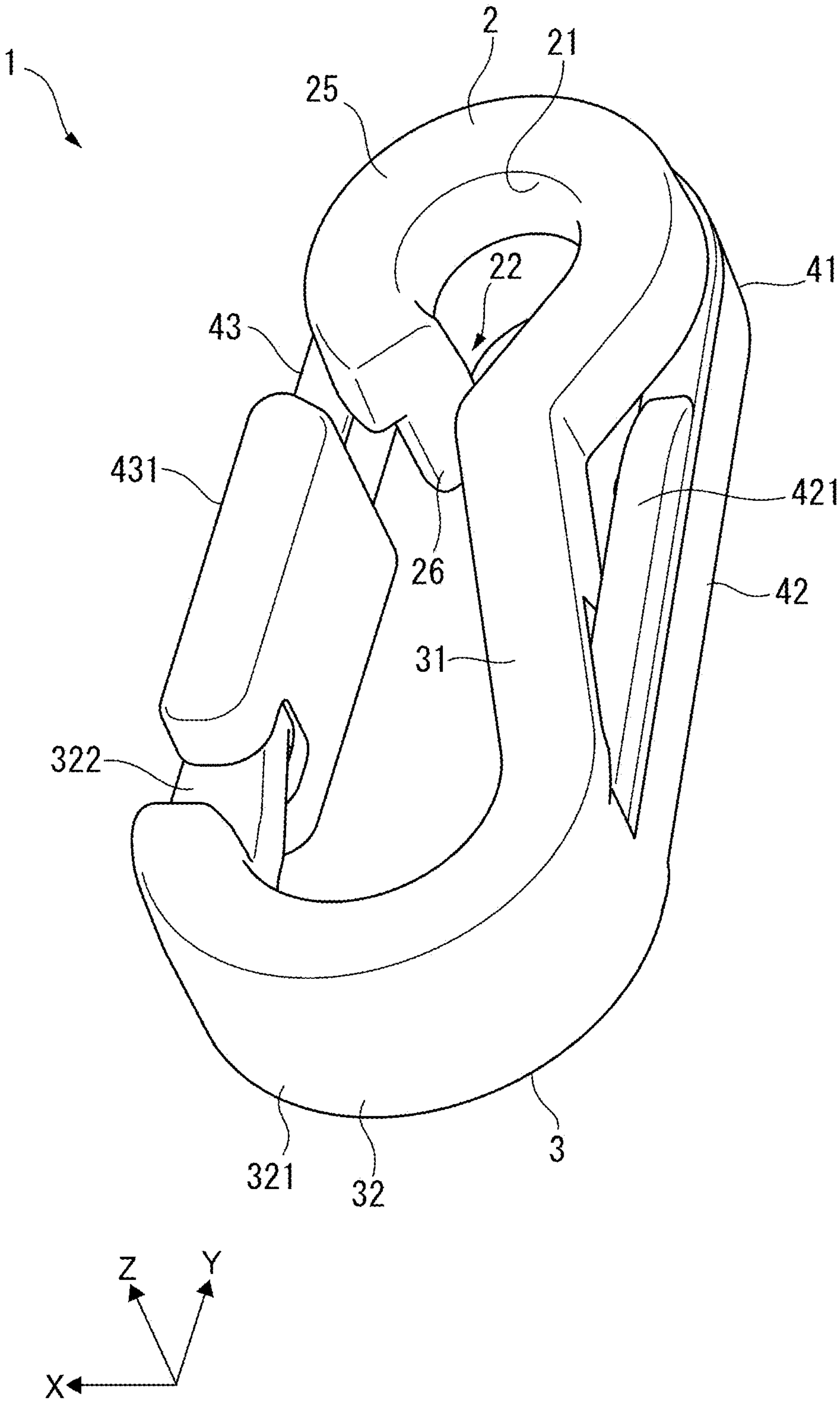
FIG. 5 is a perspective view of the connector according to the exemplary embodiment.

As illustrated in FIG. 5, the curved portion 41 and the extension portion 42 have the respective Z directional dimensions that are approximately equal to the protrusion 26 of the base 2, and are arranged in the same range as the protrusion 26 in the Z direction. The extension portion 42 has a thick portion 421 that protrudes in the +Z direction from the extension portion 42 and is connected to the shaft 31. The extension portion 42 is supported by operator's fingers when the operator deforms the cover 43 to flex toward the hook space S side (−X side). At this time, the thick portion 421 moves in conjunction with the extension portion 42 to ensure a wide contact area with the fingers.

The cover 43 is swingably supported by the curved portion 41. Elastic deformation of the spring 4 allows the cover 43 to move between the closed position, in which the opening SA of the hook space S is closed, and the open position, in which the opening SA is open. The opening and closing of the cover 43 will be described in detail below.

The cover 43 has an engagement portion 431 engageable with the latch piece 322 of the hook 3. Specifically, as illustrated in FIG. 4, the engagement portion 431 has a thickness extending to the +Z side of the curved portion 41, and a Z directional dimension D1 of the engagement portion 431 is larger than a Z directional dimension D2 of the curved portion 41. The engagement portion 431 has a groove 432 that can house the bar 324 of the latch piece 322, and a concave portion 433 that is connected to the groove 432 and can house the bulging portion 325 of the latch piece 322. This engagement portion 431 can hold the bar 324, which is housed in the groove 432, in the Z direction. The engaging portion 431 can be engaged with the bulging portion 325, which is housed in the concave portion 433, in the Y and X directions.

When the cover 43 is in the closed position, which closes the opening SA of the hook space S, the engagement portion 431 is engaged with the latch piece 322. In this state, the spring 4 is more flexed than before the assembly of the connector 1 (see FIG. 8), and the curved portion 41 urges the cover 43 toward the latch piece 322. Therefore, the engagement between the engagement portion 431 and the latch piece 322 is maintained by an elastic force of the spring 4.

When the cover 43 is in the closed position, a gap G exists between the inner circumferential surface 411 of the curved portion 41 and the outer circumferential surface 261 of the protrusion 26 (see FIG. 3). Therefore, when the spring 4 is elastically deformed, the curved portion 41 can be elastically deformed until the inner circumferential surface 411 comes in contact with the outer circumferential surface 261 of the protrusion 26.

Operation of Connector 1

An operation of the connector 1 of the exemplary embodiment will be described. A description will be made using the first ring 91 and the second ring 92 in FIG. 9 as examples of the object to be attached to the connector 1.

Figure 6:
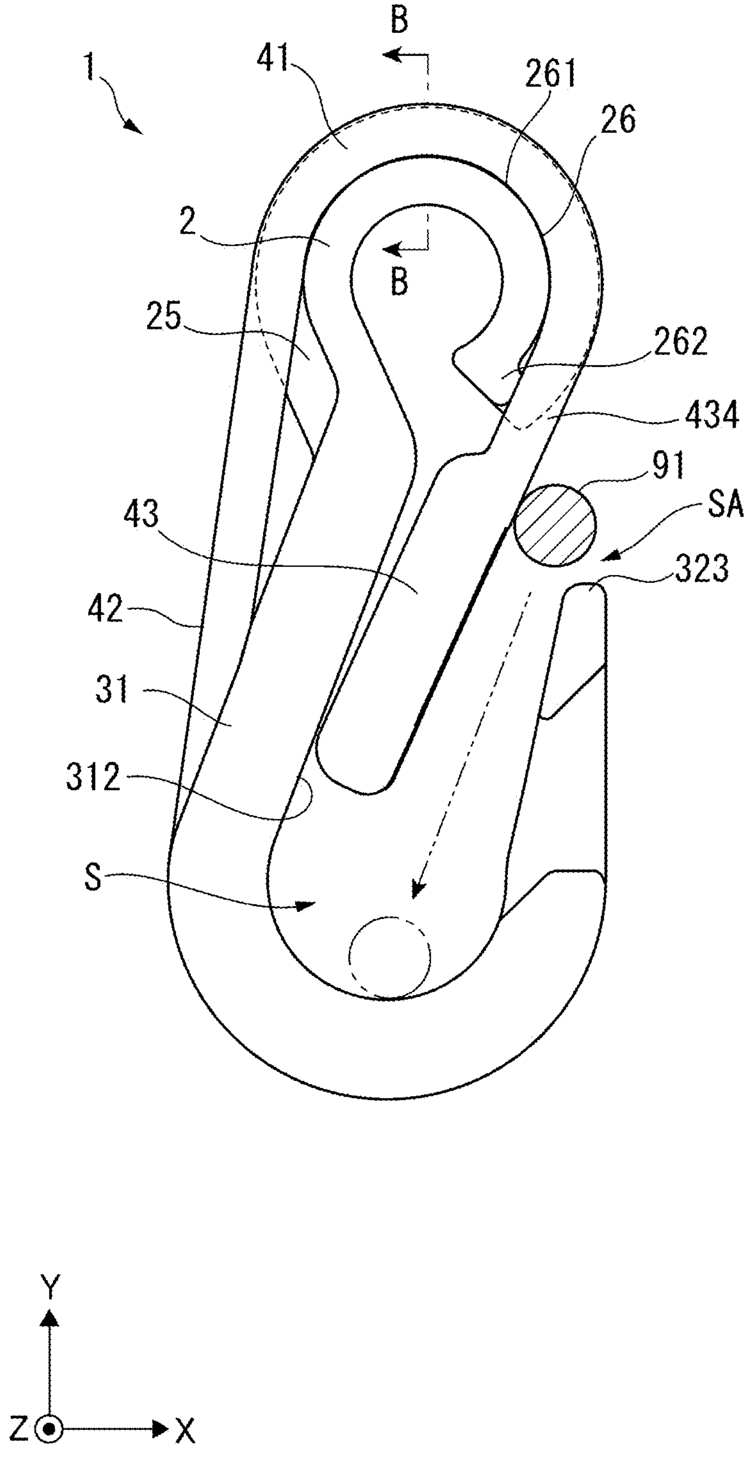
FIG. 6 is a rear view of the connector in operation according to the exemplary embodiment.
Figure 7:
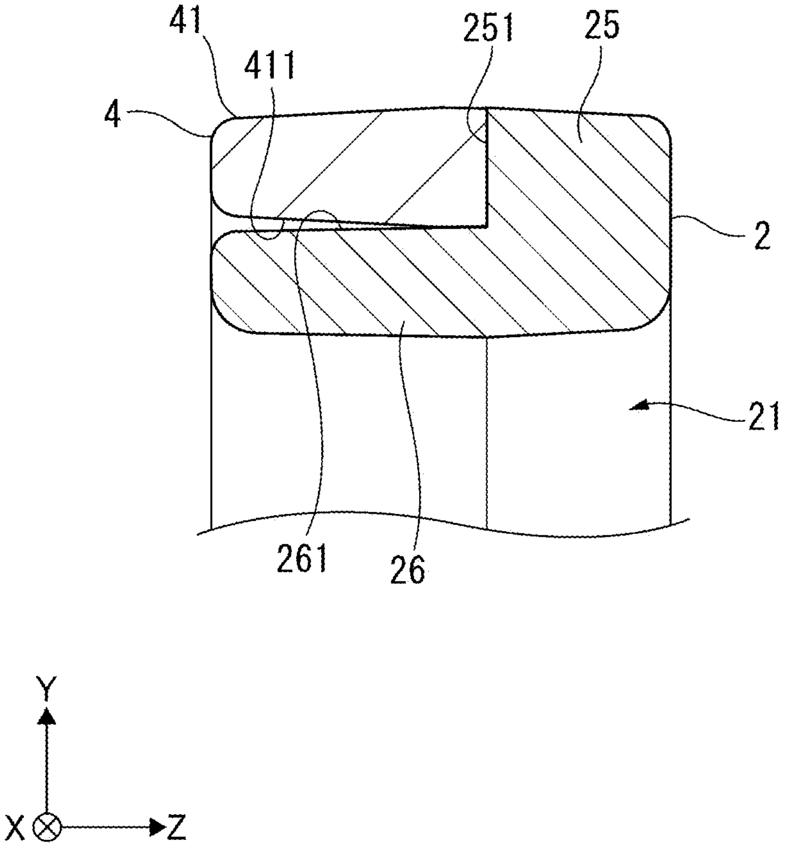
FIG. 7 is a cross-sectional view taken along a B-B line in FIG. 6.

First, an operator applies pressure to the cover 43 toward the hook space S (−X side) by pressing the first ring 91 against the cover 43, as illustrated in FIG. 6. As a result, the spring 4 is elastically deformed and the cover 43 moves from the closed position, which closes the opening SA of the hook space S, to the open position, which opens the opening SA.

Here, when the spring 4 is elastically deformed, a neighboring portion 434 to the curved portion 41 in the cover 43 is deformed so as to flex toward the hook space S (−X side). The curved portion 41 is also deformed so that the inner circumferential surface 411 of the curved portion 41 comes in contact with the outer circumferential surface 261 of the protruding portion 26 (see FIG. 7).

As illustrated in FIG. 6, when the cover 43 moves to the open position, the first ring 91 passes through the opening SA of the hook space S and is housed in the hook space S. That is, the first ring 91 is positioned while penetrating the hook space S in the Z direction.

When the cover 43 is in the open position, the protrusion 26 supports the curved portion 41. The cover 43 may be restricted in movement by coming into contact with at least one of the inner side surface 312 of the shaft 31 or the convex portion 262 of the protrusion 26.

When the first ring 91 is housed in the hook space S, the pressure applied to the cover 43 is released. Then, due to the elasticity of the spring 4, the cover 43 moves from the open position to the closed position, and the engagement portion 431 re-engages with the latch piece 322.

Next, as illustrated in FIG. 2, the operator moves the first ring 91 within the hook space S toward the base 2. At this time, the first ring 91 is guided by the inner side surface 312 of the shaft 31 toward the cutout 22 of the base 2, and can come into contact with the distal end 24 of the base 2. By contact with the distal end 24 of the base 2, the first ring 91 is positioned with respect to the cutout 22 of the base 2.

Then, the operator presses the first ring 91 into the cutout 22 of the base 2. With this operation, the base 2 is elastically deformed to expand the cutout 22, and the first ring 91 passes through the cutout 22 and is housed in the hole 21 of the base 2. That is, the first ring 91 is positioned while penetrating the hole 21 of the base 2 in the Z direction. The first ring 91 is thus attached to the base 2.

Figure 9:
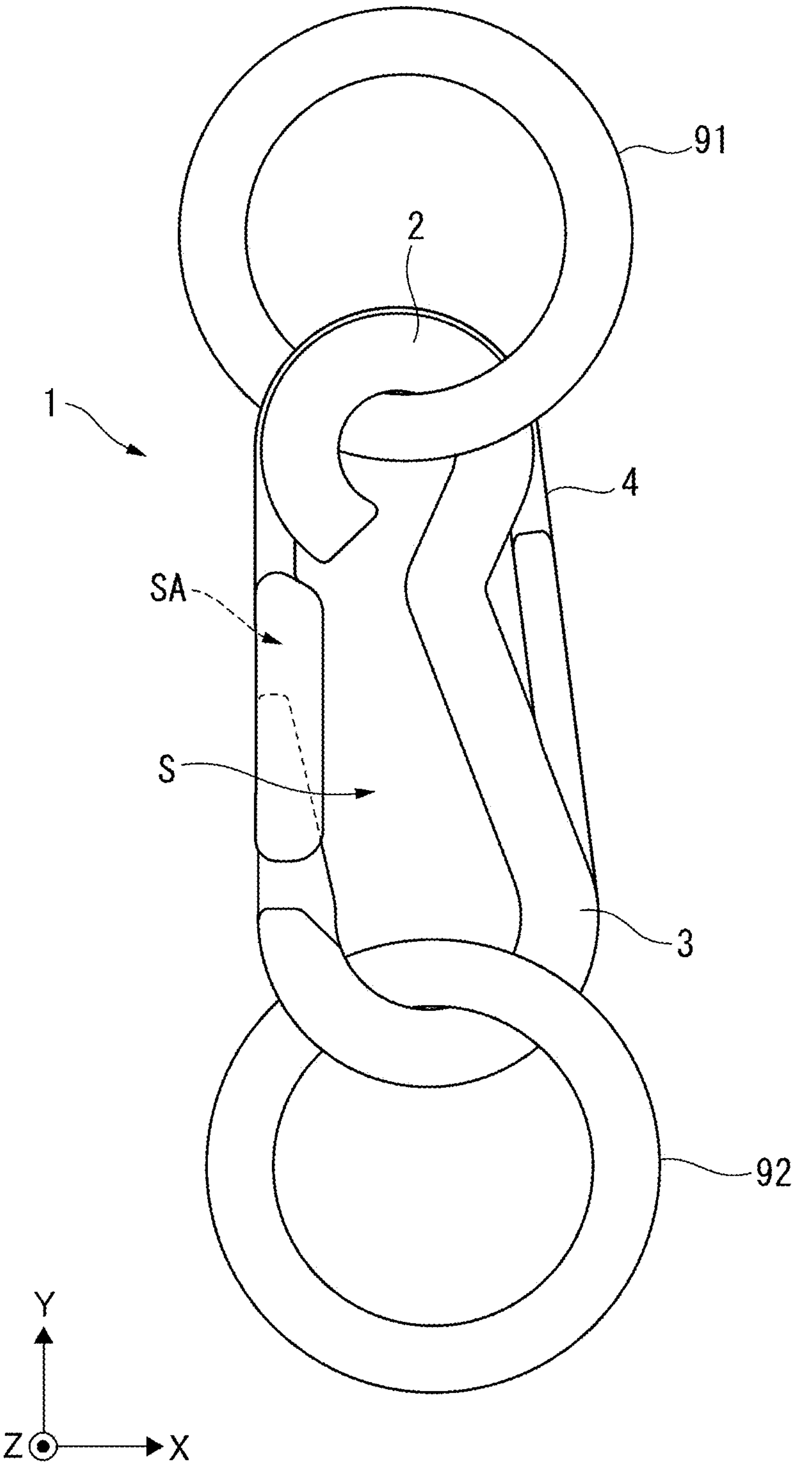
FIG. 9 is a front view of the connector in use according to the exemplary embodiment.

Subsequently, similar to the first ring 91 described above, the operator houses the second ring 92 in the hook space S. The second ring 92 is thus attached to the hook 3. As a result, as illustrated in FIG. 9, the connector 1 can connect the first ring 91 and the second ring 92.

Production Method of Connector 1

An example of a production method of the connector 1 of the exemplary embodiment will be described.

Figure 8:
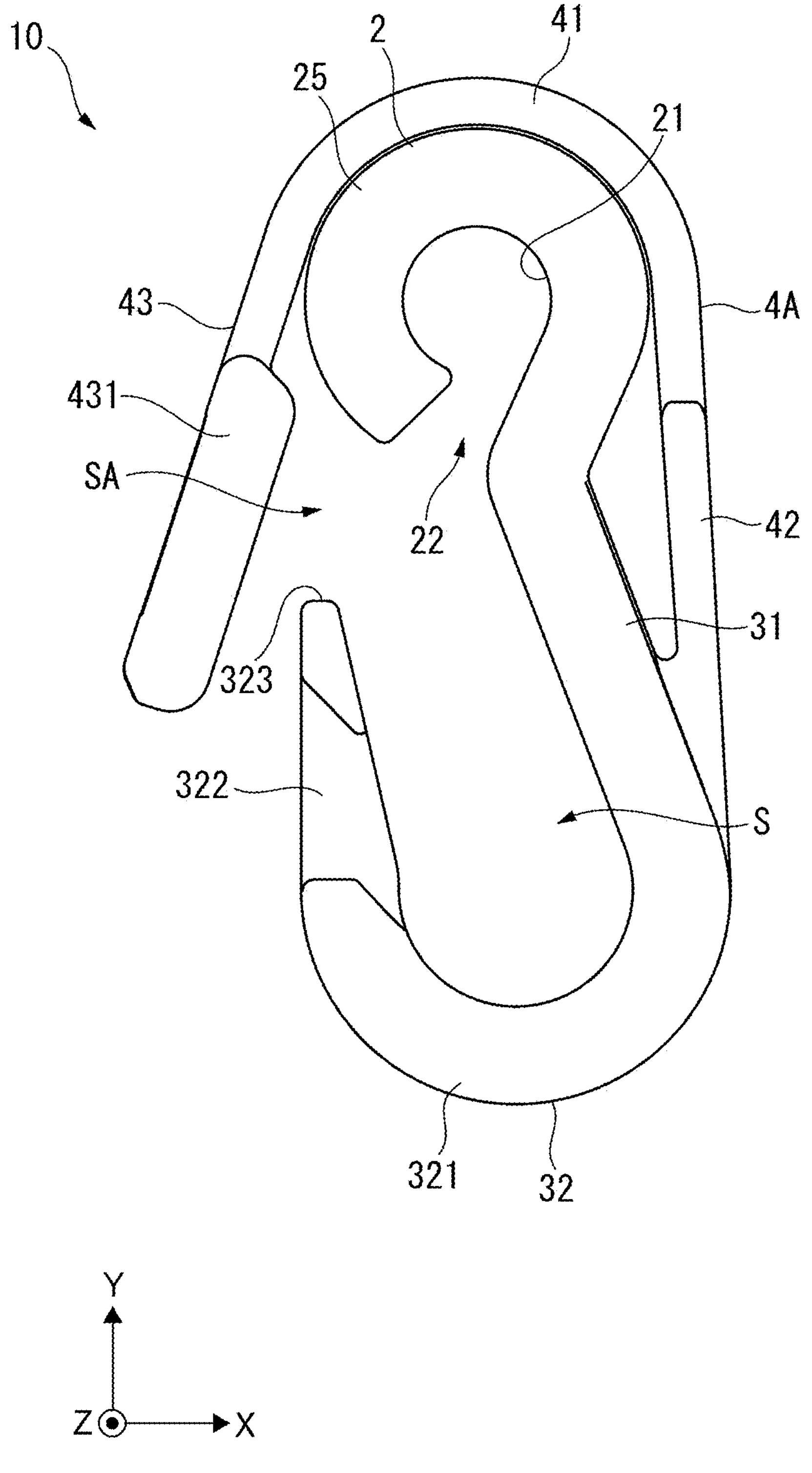
FIG. 8 is a front view of the connector in an unassembled state according to the exemplary embodiment.

First, a molded product 10 as illustrated in FIG. 8 is integrally molded using a resin material. The molded product 10, which includes substantially the same configuration as the above-described connector 1, includes the base 2, the hook 3, and a spring 4A.

Here, since the spring 4A has a similar shape as the spring 4 described above, the similar symbol to the spring 4 is used, but the spring 4A is positioned differently from the spring 4. Specifically, the curved portion 41 of the spring 4A is positioned offset from an outer circumferential surface of the base 2 when viewed from the Z direction. In other words, the curved portion 41 is arranged to surround the body 25 of the base 2 by an area smaller than half the circumference of the body 25. The engagement portion 431 is not engaged with the latch piece 322 and is arranged on a side opposite to the hook space S with respect to the latch piece 322. The spring 4 is thus arranged to overlap neither the base 2 nor hook 3 in the Z direction.

Next, the connector 1 is assembled using the molded product 10. Specifically, pressure is applied to the −Z side and +X side of the cover 43 so that the cover 43 reaches the hook space S via the −Z side of the latch piece 322. Subsequently, by releasing the pressure applied on the cover 43, the engagement portion 431 is engaged with the latch piece 322. The connector 1 is thus assembled.

Effects of Exemplary Embodiment

In the exemplary embodiment, the base 2, the hook 3, and the spring 4 for forming the connector 1 can be integrally molded using a resin material. The spring 4 can reliably have a long spring length extending from the extension portion 42 through the curved portion 41 to the cover 43. With this configuration, even without forming a typical thin portion, the spring 4 can be elastically deformed to move the cover 43 between the closed position and the open position. Since the spring 4 is arranged to overlap the base 2 in the Z direction, the spring 4 is protected from the outside by the base 2. Therefore, according to the exemplary arrangement, the connector 1 capable of ensuring strength and capable of being integrally molded using a resin material is provided.

Elastic deformation of the spring 4 in contact with the base 2 enables a stable opening/closing movement of the cover 43.

In the exemplary embodiment, when the cover 43 is in the closed position, the gap G exists between the inner circumferential surface 411 of the curved portion 41 and the protrusion 26, and when the cover 43 is in the open position, the inner circumferential surface 411 of the curved portion 41 comes in contact with the protrusion 26. According to this configuration, the protrusion 26 can support the curved portion 41 without unnecessarily obstructing the movement of the spring 4, thereby improving the strength of the connector 1.

In the exemplary embodiment, the protrusion 26 has the arc-shaped outer circumferential surface 261 that can come into contact with the inner circumferential surface 411 of the curved portion 41. According to this configuration, the protrusion 26 can support a wider area of the curved portion 41, thereby further improving the strength of the connector 1.

In the exemplary embodiment, the base 2 has a ring shape with the cutout 22 interconnecting the hole 21 of the base 2 with the hook space S. In this configuration, an object to be attached can reach the hole 21 of the base 2 through the hook space S and the cutout 22. When a diameter of the object is larger than a width of the cutout 22, the object can pass through the cutout 22 by the elastic deformation of the base 2. This makes it easy to attach the object to the base 2.

In the exemplary embodiment, the base 2 includes: the base end 23 to which the shaft 31 is connected; and the distal end 24 provided opposite the base end 23 across the cutout 22 and facing the hook space S. In this configuration, by bringing the object to be attached into contact with the distal end 24 of the base 2 when moving the object from the hook space S to the cutout 22, the object can be easily positioned with respect to the cutout 22.

In the exemplary embodiment, the extension portion 42 is connected to the outer side surface 311 of the shaft 31 opposite from the hook space S. In this configuration, the spring 4 is arranged along the edge of the hole 21 of the base 2, outside the shaft 31. Accordingly, a length of the spring 4 can be reliably made long while avoiding interference between the spring 4 and the shaft 31. This facilitates an opening/closing movement of the cover 43.

In the exemplary embodiment, the cover 43 has the engagement portion 431 engageable with the distal end 323 of the folded portion 32, and the Z directional dimension D1 of the engagement portion 431 is larger than the Z directional dimension D2 of the curved portion 41. In this configuration, the engagement strength between the engagement portion 431 and the distal end 323 of the folded portion 32 can be improved.

For the connector 1 of the exemplary embodiment, as described above, a molding step of integrally molding the molded product 10 using a resin material, and after the molding step, an assembling step including elastically deforming the spring 4 so that the curved portion 41 overlaps the base 2 in the Z direction and engaging the cover 43 with the distal end 323 of the folded portion 32 (latch piece 322 in the exemplary embodiment) are provided.

According to such a production method, the connector 1 of the exemplary embodiment is suitably producible. Specifically, because there is no overlap between the components in the molded product 10, a mold used in the molding step of the molded product 10 can be simplified. Since the spring 4 is elastically deformed in the assembling step, the connector 1 after the assembling step is being urged toward the latch piece 322. Thus, the engagement between the cover 43 and the latch piece 322 is maintainable by the elastic force of the spring 4.

Modifications

In the above exemplary embodiment, the first ring 91 and the second ring 92 are given as examples of the objects connected by the connector 1, but not exhaustive. The connector 1 can connect any objects.

In the above exemplary embodiment, the protrusion 26 of the base 2 has the arc-shaped outer circumferential surface 261, but the shape of the protrusion 26 is not limited thereto. For instance, the protrusion 26 may be a convex portion of any shape that is arranged near the edge of the hole 21 in the base 2, or may be provided by multiple convex portions that are arranged intermittently along the edge of the hole 21 in the base 2. It is not essential for the base 2 to have the protrusion 26. The protrusion 26 may be omitted.

In the above exemplary embodiment, the base 2 has a ring shape formed with the cutout 22, but the configuration of the base 2 is not limited thereto. For instance, the base 2 may have a continuous ring shape without the cutout 22. Alternatively, the base 2 is not limited to having a ring shape, and may have other shapes with the hole 21 formed therein. The base 2 may have a cutout not penetrating the hook space S instead of the above-described cutout 22.

In the above exemplary embodiment, the curved portion 41 of the spring 4 overlapping the base 2 in the Z direction means that the entire curved portion 41 does not have to overlap the base 2, and it is sufficient if at least a part of the curved portion 41 overlaps the base 2. For instance, a part of the curved portion 41 may protrude outside the base 2.

In the above exemplary embodiment, the extension portion 42 of the spring 4 is connected to the outer side surface 311 of the shaft 31, but the connection is not limited thereto. Specifically, the extension portion 42 may be connected to parts other than the outer side surface 311 of the shaft 31, for instance, a front side facing the +Z side of the shaft 31 or a rear side facing the −Z side of the shaft 31.

In the exemplary embodiment, the cover 43 of the spring 4 has the engagement portion 431 engageable with the distal end 323 of the folded portion 32. But the configuration of the engagement portion 431 can be optionally altered. The configuration of the folded portion 32 corresponding to the engagement portion 431 can also be altered similarly. Alternatively, the cover 43 of the spring 4 may not include the engagement portion 431 described above, and a part of the cover 43 may simply be in contact with the distal end 323 of the folded portion 32 in the X direction.

The connector of the invention is not limited to being produced by the production method of the above exemplary embodiment, but may be produced by any production method.

The invention claimed is:

1. A connector comprising:
- a base having a hole penetrating in a thickness direction;
- a hook including a shaft connected to the base and a folded portion folded from the shaft, the hook and the base defining a hook space penetrating therebetween in the thickness direction; and
- a spring connected to the shaft, wherein;
  - the base, the hook, and the spring are integrally molded using a resin material,
  - the spring includes:
    - an arc-shaped curved portion that overlaps the base in the thickness direction and is arranged along an edge of the hole;
    - an extension portion extending to connect one end of the curved portion to the shaft; and
  - a cover connected to the other end of the curved portion, and
- the cover is movable between a closed position, in which an opening of the hook space is closed, and an open position, in which the opening is open, the opening being defined between a distal end of the folded portion and the base.

2. The connector according to claim 1, wherein:
- the base includes:
  - a body facing the curved portion in the thickness direction; and
  - a protrusion protruding from the body in the thickness direction toward the curved portion,
- when the cover is in the closed position, a gap exists between an inner circumferential surface of the curved portion and the protrusion, and
- when the cover is in the open position, the inner circumferential surface of the curved portion is in contact with the protrusion.

3. The connector according to claim 2, wherein the protrusion has an arc-shaped outer circumferential surface capable of contacting the inner circumferential surface of the curved portion.

4. The connector according to claim 1, wherein the base has a ring shape with a cutout interconnecting the hole with the hook space.

5. The connector according to claim 4, wherein
- the base includes:
  - a base end connected to the shaft; and
  - a distal end provided opposite the base end across the cutout and facing the hook space.

6. The connector according to claim 1, wherein the extension portion is connected to an outer side surface of the shaft opposite from the hook space.

7. The connector according to claim 1, wherein:
- the cover has an engagement portion engageable with the distal end of the folded portion, and
- a dimension in the thickness direction of the engagement portion is larger than a dimension in the thickness direction of the curved portion.

8. A method of producing the connector according to claim 1, the method comprising:
- integrally molding a molded product using a resin material, the molded product including the base, the hook, and a spring with the curved portion positioned offset from an outer circumference of the base when viewed from the thickness direction; and
- after the molding, assembling the connector, including:
  - elastically deforming the spring so that the curved portion overlaps the base in the thickness direction, and
  - engaging the cover with the distal end of the folded portion.

* * * * *